United States Patent [19]

Marcus et al.

[11] 4,444,344
[45] Apr. 24, 1984

[54] HANGER SUPPORT

[75] Inventors: Konrad H. Marcus; Michael J. Cody, both of Holland, Mich.

[73] Assignee: Prince Corporation, Holland, Mich.

[21] Appl. No.: 422,075

[22] Filed: Sep. 23, 1982

[51] Int. Cl.³ .............................................. B60R 7/08
[52] U.S. Cl. .................................. 224/313; 224/42.42
[58] Field of Search ......... 224/313, 42.45 A, 42.46 A, 224/42.46 B, 311, 42.42, 42.44; 108/28; 248/291, 293, 294

[56] References Cited

U.S. PATENT DOCUMENTS

| | | | |
|---|---|---|---|
| 1,726,257 | 8/1929 | Carlisle | 224/313 |
| 2,253,423 | 8/1941 | Fellers et al. | 224/311 |
| 3,261,521 | 7/1966 | Meccico et al. | 224/42.44 |
| 3,394,911 | 7/1968 | Sorensen | 248/293 |

Primary Examiner—Steven M. Pollard
Assistant Examiner—David Voorhees
Attorney, Agent, or Firm—Price, Heneveld, Huizenga & Cooper

[57] ABSTRACT

A vehicle hanger support includes a downwardly pivoted U-shaped member which pivots on a frame between a stored position within a recess in the vehicle headliner and a lowered use position. In one embodiment, a sliding door encloses the U-shaped member when in the stored position. This construction provides a sturdy hanger support which can accommodate several clothes hangers and yet, one which can be retracted to a recessed position when not in use.

6 Claims, 5 Drawing Figures

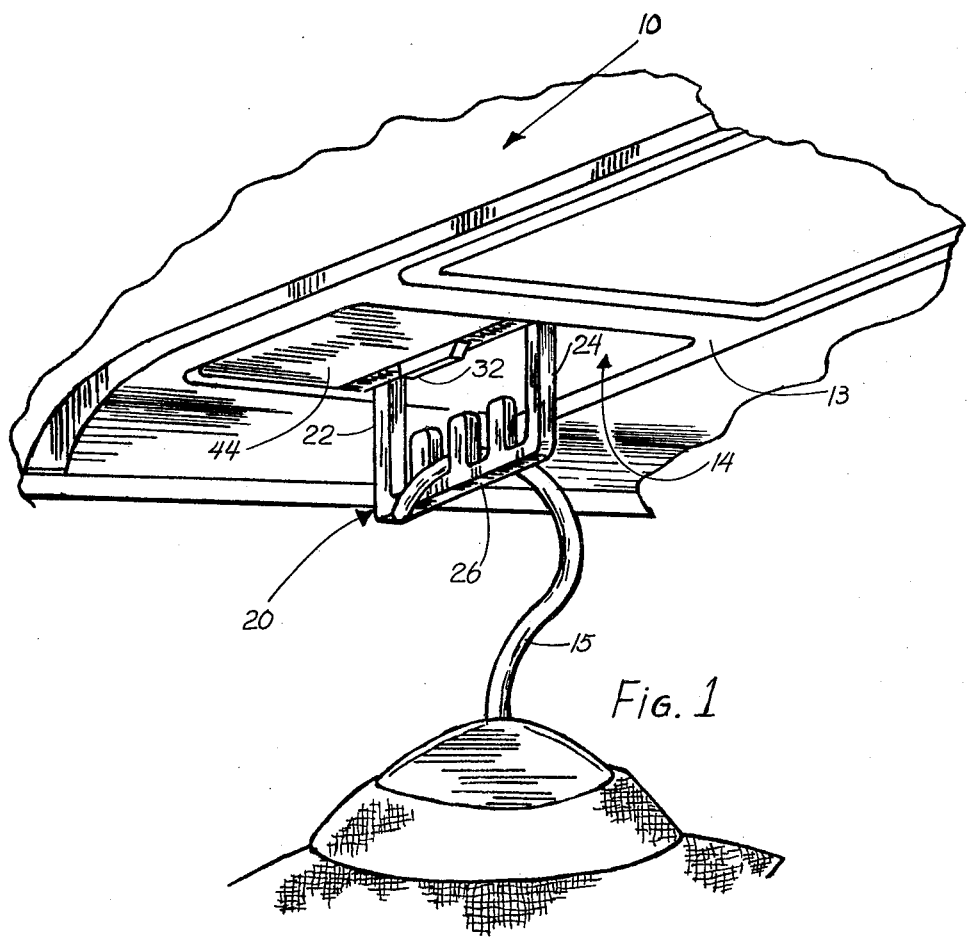
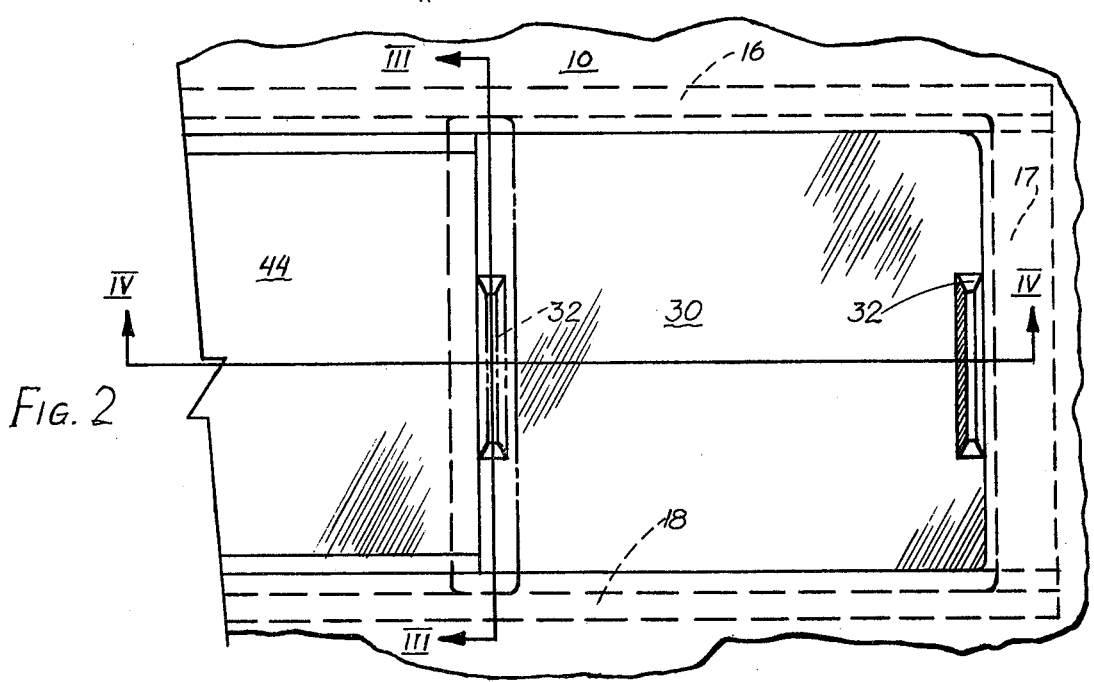

HANGER SUPPORT

BACKGROUND OF THE INVENTION

The present invention relates to vehicle accessories and particularly to a hanger support.

Typically, vehicles are provided with small hooks placed on either side of the headliner of the vehicle behind the front seat for receiving clothes hangers such that clothes can be conveniently carried on a hanger in the hanging position without obstructing the driver's vision unnecessarily or taking up interior space. Such hooks typically are relatively small and can accommodate only one or two hangers. Also, they project from the upholstery line of the headliner of the vehicle and thus, are somewhat unsightly and present a safety hazard in the form of a projection against which a person can bump their head either while entering or exiting the vehicle or in the event of an accident.

An improvement to the standard hook has been suggested in, for example, U.S. Pat. No. 4,221,354, issued Sept. 9, 1980 and assigned to the present assignee. In this device, a hook is pivotally and retractably mounted within a recess in the headliner at the side of a vehicle and is pivoted between a stored flush position within the vehicle headliner and an extended position for use. Although such a device provides a neat appearing and safer hook than the conventional hooks, the size of the hook and, therefore, its storage capacity is somewhat limited. Other hooks are shown in U.S. Pat. Nos. 2,602,622; 2,706,049; 2,071,257; 2,901,207; and 3,362,669 and either are not suited for use in a vehicle or, in the case of U.S. Pat. No. 2,706,049, which is adapted to be mounted to the edge of vehicle window, is not an integral part of the vehicle and although providing increased storage capacity, is not an aesthetically pleasing device in today's modern vehicle interior and presents an increased safety hazard over even the conventional hooks.

SUMMARY OF THE PRESENT INVENTION

Thus, there exists a need for an attractive and conveniently usable clothes hanger support with increased storage capacity such that several clothes hangers can be securely held and one which provides not only a neat appearance when not in use but also eliminates or reduces the safety hazard which a projecting hook in the interior of a vehicle inherently presents.

The system of the present invention satisfies these needs by providing a downwardly pivoted U-shaped support which pivots between a stored position within a recess in the vehicle headliner and a lowered use position. In one embodiment, a sliding door encloses the U-shaped member when in the stored position. This construction provides a substantially sturdier support which can accommodate several clothes hangers and yet, one which can be retracted to a recessed position when not in use.

These and other features, advantages and objects of the present invention will become apparent upon reading the following description thereof together with reference to the accompanying drawings in which :

BRIEF DESCRIPTION OF THE DRAWINGS

FIG. 1 is a fragmentary perspective view of a clothes hanger support embodying the present invention;

FIG. 2 is an enlarged fragmentary bottom plan view, partly in phantom form, of one embodiment of the support of the present invention;

DETAILED DESCRIPTION OF THE PREFERRED EMBODIMENT

Figure 3:
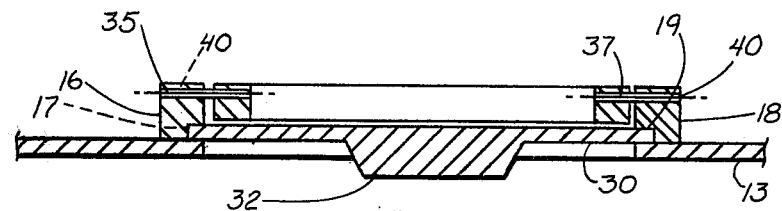
FIG. 3 is a fragmentary, cross-sectional view taken along section line III—III of FIG. 2.
Figure 4:
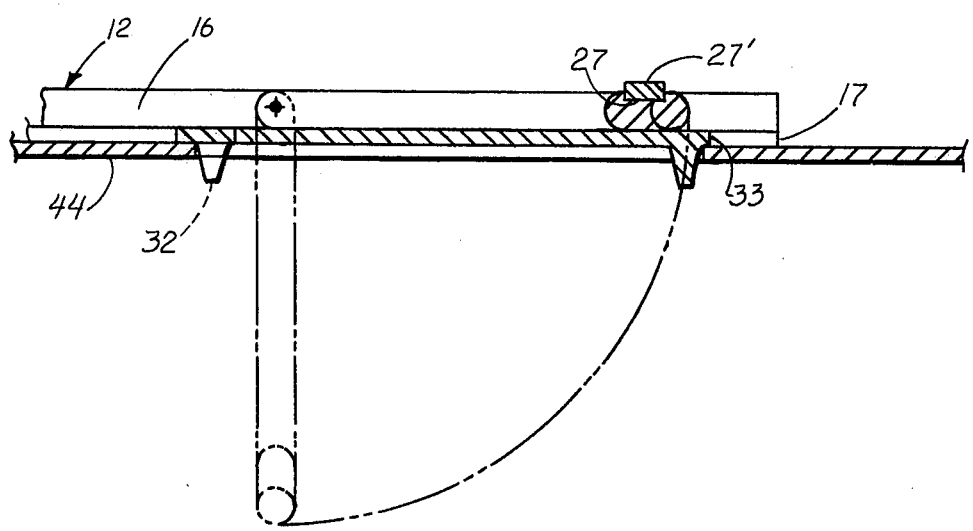
FIG. 4 is a fragmentary, cross-sectional view, partly in phantom form, taken along section line IV—IV of FIG. 2.

Referring initially to FIG. 1, there is shown a support 20 embodying the present invention installed in the headliner 10 of a vehicle, such as an automobile. The support is pivotally mounted within a frame 12, surrounding a recess 14 formed upwardly in the vehicle headliner with one such unit typically located on either side of the vehicle near the rear window at a convenient location such that clothes hangers 15 can be readily positioned on the support by either opening the rear door or by moving the front seat to a forward position in a two-door vehicle. The construction of the support assembly is best seen by reference to FIGS. 2 through 4 which show the frame 12 as including a pair of fore and aft extending side braces 16 and 18 joined at opposite ends by integral cross braces 17 (FIGS. 3 and 4). Frame 12 is generally rectangular and made of a material of suitable strength to support member 20 and articles on hangers 15 positioned thereover. The frame can be of a cast aluminum alloy, polycarbonate or the like and is adapted to fit within the recess 14 formed in the vehicle headliner. Frame 12 is secured to the sheetmetal roof of the vehicle by suitable fastening means which may include mounting bosses threaded to receive fastening screws or other conventional fastening devices (not shown).

In one embodiment of the invention, frame braces 16 and 18 include longitudinally extending notches 19 for receiving and guideably supporting between the headliner panel 13 and these frame members a sliding cover door 30 which is movable, as shown in FIG. 4, between a closed position with the support 20 pivoted to a horizontal position within recess 14 of the housing and an open position moved forwardly, as shown in FIG. 1, by means of tab 32 such that support 20 can depend downwardly for use. In this embodiment, frame members 16 and 18 extend a sufficient distance to allow the sliding covered door 30 to move forwardly, as illustrated in FIGS. 1 and 4, permitting support 20 to pivot to a generally vertically extending position with the sliding door in a fully opened position and underlining a decorative cover panel 44 which is secured to the forward end of frame 12 and extends between members 16 and 18.

Figure 5:
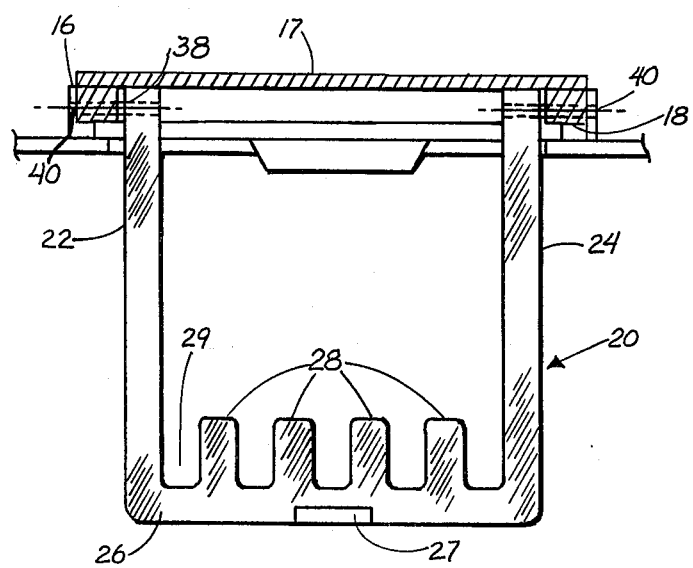
FIG. 5 is an enlarged front elevational view of the U-shaped hanger of the present invention partly in cross section.

The generally U-shaped support 20 includes downwardly depending side legs 22 and 24 with a cross leg 26 extending therebetween and including upwardly projecting spaced tines 28 defining therebetween downwardly depending spaced slots 29, as best seen in FIGS. 1 and 5, for receiving the wire curved portion of a conventional clothes hanger 15, as best illustrated in FIG. 1. Support 20 is pivotally secured to the side members 16 and 18 of frame, as best seen in FIG. 4, by means of pivot pins 35 and 37 secured by force-fitting or by a bonding adhesive to apertures 38 at the ends of arms 22 and 24 of member 20 remote from cross member 26 and pivotally positioned within apertures 40 formed in frame members 16 and 18 and located, as illustrated in FIGS. 3 and 4. The hanger of the present invention is held within recess 14 in a stored position by the use of a magnet 27 (FIG. 5), in this uncovered embodiment of the invention, in which the support is pivotally mounted to the uncovered frame 12. A mating magnet 27' (FIG. 4) is mounted to the frame to releasably hold support 20 in a horizontal stored position. In the sliding covered embodiment, support 20 is self-storing by simply sliding door 30 rearwardly by tab 32 which causes the edge 33 of the door to contact legs 22 and 24 of bar 20, pivoting the bar in a counterclockwise direction, as seen in FIG. 4, upwardly to a generally horizontal, stored position within recess 14. With the door 32 in a closed position, as illustrated in FIG. 4, the support 20 is cradled and held in a stored position, and recess 14 is substanially covered by panel 44 and door 30.

The relatively large hanger support defined by the pivoted U-shaped member 20 pivots downwardly into a position shown in FIGS. 1, 4 and 5 and permits storage of several hangers thereon, due partly to the fact that it is supported by a pair of legs each pivotally secured to the mounting frame which allows heavier objects to be hung thereon, and the legs 22 and 24 are spaced apart a sufficient distance to allow several hangers to be positioned thereon.

Three or four upwardly extending spacing shoulders 28 can be provided, as illustrated in FIGS. 1 and 5, respectively, to define slots 29 for conveniently separating clothes hangers which facilitate the positioning of hangers thereon. Although in the preferred embodiment of the invention, the U-shaped member 20 was pivoted such that it drops downwardly under the force of gravity. Member 20 can also be biased by suitable coil spring extending between frame 12 and one of the legs 22 or 24 to be spring-loaded to a raised position within recess 14 if desired. With such construction, magnets 27, 27' can be eliminated. If spring biased to a horizontal stored position within recess 14, support can be moved to an operative position by pulling the support 20 downwardly and holding it until the weight of a clothes hanger 15 is positioned thereon which will hold it in a lowered position for continued use.

It will become apparent that these and other modifications to be preferred embodiment of the present invention can be made without departing from the spirit or scope thereof as defined by the appended claims.

The embodiments of the invention in which an exclusive property or privilege is claimed are defined as follows:

1. A support which can be mounted to a vehicle for receiving clothes hangers comprising:
   a frame having brace means adapted to be secured to a vehicle roof above the vehicle headliner to define a recess in the headliner; and
   a generally U-shaped support having side legs and a cross leg, wherein ends of each of said side legs are pivotally mounted to said brace means of said frame and pivot said support between a stored position substantially flush with said frame and above the vehicle headliner and a lowered use position in which one or more clothes hangers can be hung over said cross leg extending between said side legs.

2. The apparatus as defined in claim 1 and further including means for releasably holding said support in a stored position.

3. The apparatus as defined in claim 2 wherein said cross leg includes upwardly extending spaced shoulders defining notches therebetween for separating clothes hangers positioned on said cross leg.

4. The apparatus as defined in claim 3 wherein means for releasably holding said support comprises a magnetic catch coupled to said support.

5. A support which can be mounted to a vehicle for receiving clothes hangers comprising:
   a frame defining a recess and adapted to be secured to a vehicle roof;
   a generally U-shaped support having side legs and a cross leg, wherein ends of each of said side legs are pivotally mounted to said frame and pivot said support between a stored position substantially flush with said frame and a lowered use position in which one or more clothes hangers can be hung over said cross leg extending between said side legs wherein said cross leg includes upwardly extending spaced shoulders defining notches therebetween for separating clothes hangers positioned on said cross leg;
   means for releasably holding said support in a stored position; and
   wherein said frame includes guide slots extending along opposite side braces and wherein said means for releasably holding said support comprises a sliding door slidably mounted to said guide slots for enclosing said support within said recess.

6. A support which can be mounted to a vehicle for receiving clothes hangers comprising:
   a generally U-shaped hanger support having side legs and a cross leg wherein said cross leg includes upwardly extending spaced shoulders defining notches therebetween for separating clothes hangers positioned on said cross leg;
   means including a frame defining a recess for receiving said support for pivotally mounting ends of said side legs to a vehicle for movement between a stored position substantially flush with the surface of the vehicle and a lowered use position in which one or more clothes hangers can be hung over said cross leg extending between said side legs;
   means for releasably holding said support in a stored position; and
   wherein said frame includes guide slots extending along opposite side braces and wherein said means for releasably holding said support comprises a sliding door slidably mounted to said guide slots for enclosing said support within said recess.

* * * * *